United States Patent
Treichel

(10) Patent No.: US 6,766,241 B2
(45) Date of Patent: Jul. 20, 2004

(54) FUEL INJECTION CONTROL SYSTEM

(75) Inventor: Gary John Treichel, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 144 days.

(21) Appl. No.: 10/025,942

(22) Filed: Dec. 26, 2001

(65) Prior Publication Data

US 2003/0120418 A1 Jun. 26, 2003

(51) Int. Cl.$^7$ .................. F02M 51/00; G01M 15/00
(52) U.S. Cl. .................. 701/105; 123/506; 123/480
(58) Field of Search .................. 701/105, 104, 701/102; 123/506, 478, 480, 486, 490

(56) References Cited

U.S. PATENT DOCUMENTS

| | | | |
|---|---|---|---|
| 3,910,240 A | * | 10/1975 | Omori et al. ............... 123/443 |
| 4,839,995 A | * | 6/1989 | Hutchins .................... 451/357 |
| 4,911,131 A | * | 3/1990 | Nakaniwa et al. .......... 123/478 |
| 5,003,952 A | * | 4/1991 | Weglarz et al. ............. 123/478 |
| 5,205,254 A | * | 4/1993 | Ito et al. ..................... 123/531 |
| 5,730,105 A | * | 3/1998 | McGinnity .................. 123/480 |
| 5,767,396 A | * | 6/1998 | Okamoto et al. ......... 73/119 A |
| 5,918,578 A | * | 7/1999 | Oda ............................ 123/456 |
| 6,209,513 B1 | * | 4/2001 | Sakasai et al. .............. 123/490 |
| 6,234,150 B1 | * | 5/2001 | Watanabe .................... 123/490 |
| 6,453,876 B1 | * | 9/2002 | Fukutomi et al. ........... 123/490 |

* cited by examiner

Primary Examiner—Hieu T. Vo

(57) ABSTRACT

An engine has cylinders, a fuel injection unit with a valve operable in response to a valve control signal to cause fuel to be injected into the cylinders, and a control unit which generates the valve control signal. A method of controlling the valve includes sensing a time associated with movement of the valve corresponding to start of a fuel injection event, and modifying the valve control signal as a function of the sensed time. The method further includes determining a rise time of the valve control signal, determining a valve operation delay time as a function of the rise time, determining a difference time representing a difference between a desired valve operation time and the sensed time, comparing the valve operation delay time to the difference time, and adjusting timing of the valve control signal as a function of the comparison. The method, also, as a function of the comparison, varies individual valve control signal parameter values, each associated with a particular cylinder of the engine, generates a sum value SUM representing a sum of the individual parameter values for all the cylinders, generates an average parameter AVE by dividing the SUM value by the number of cylinders, generates updated individual parameter values by subtracting the AVE value from previous individual parameter values, and modifies the valve control signal as a function of the updated individual parameter values.

9 Claims, 5 Drawing Sheets

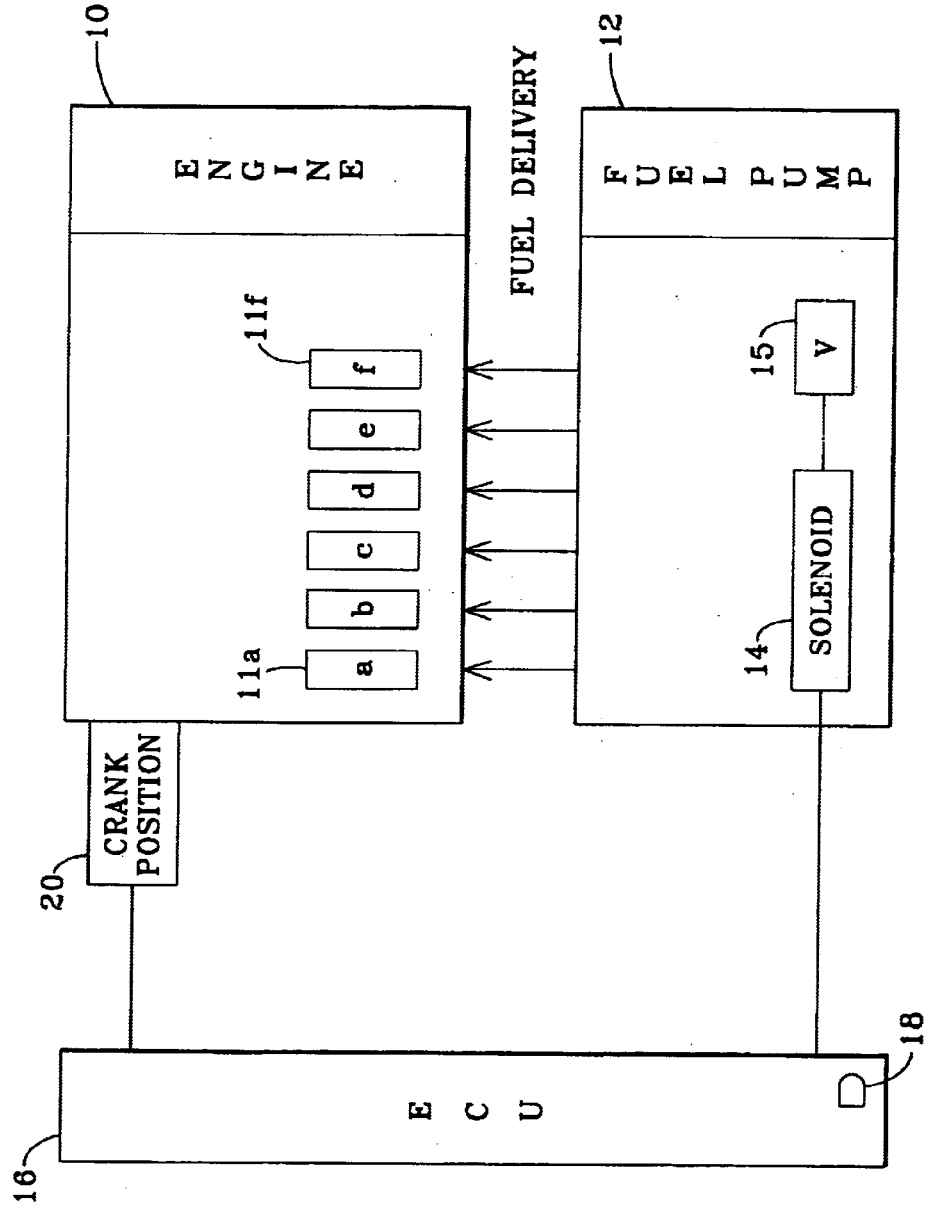

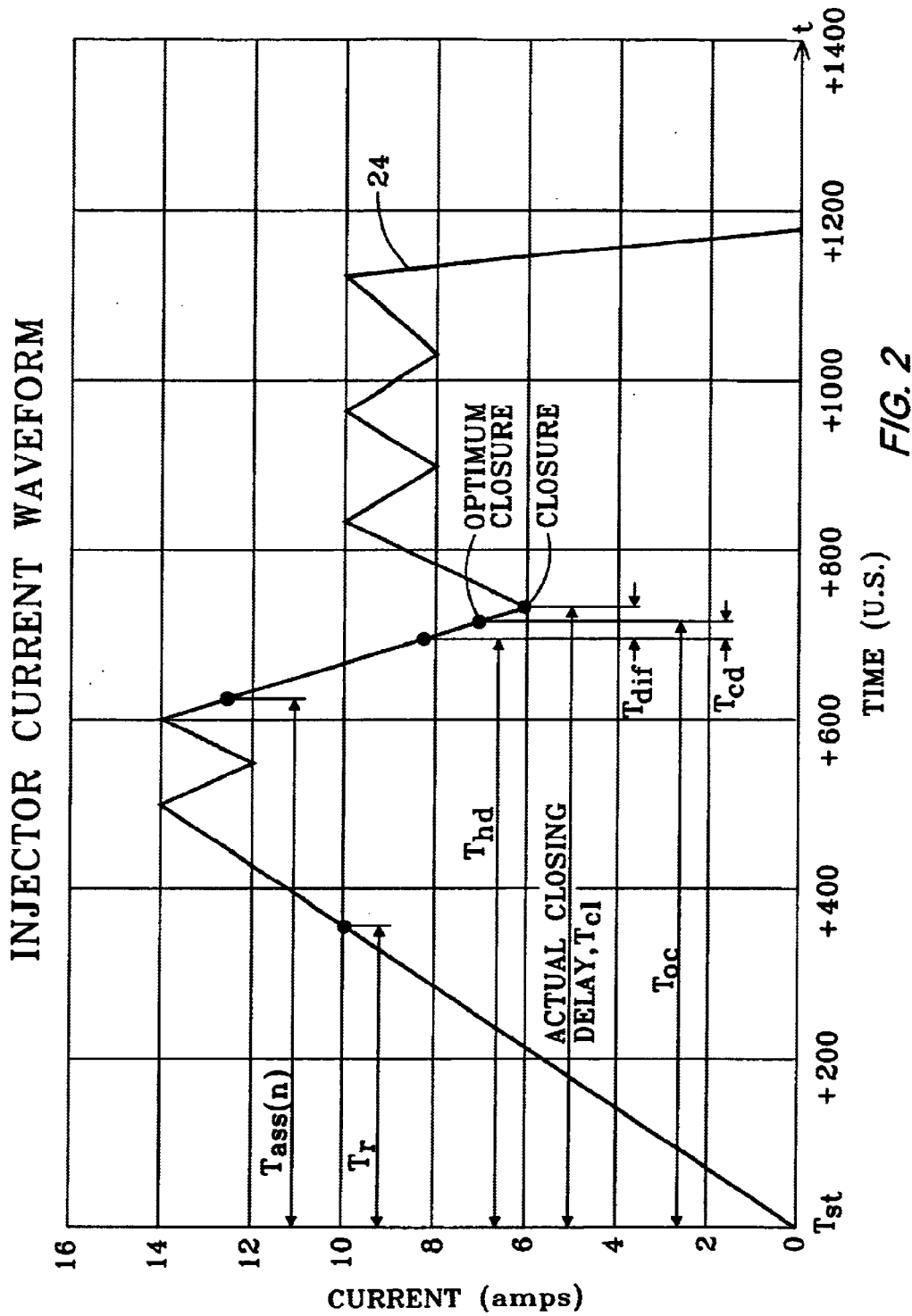

FUEL INJECTION CONTROL SYSTEM

BACKGROUND OF THE INVENTION

The present invention relates to an electronic engine fuel injection control system.

In a known diesel engine electronic fuel injection control system which uses an electronically controlled, distributor diesel fuel injection pump, such as made by Stanadyne, fuel injection timing and amount is controlled by a solenoid operated poppet or "spill" valve. When the spill valve solenoid is not energized the spill valve is open and no fuel will be injected by the pump. When the spill valve solenoid is energized the spill valve closes and fuel will be injected by the pump. An electronic control unit includes a microprocessor controlled driver circuit which generates and applies a driver current to the solenoid of the spill valve. This driver current is rapidly ramped to a high current level and held near that level for a shutoff time period slightly shorter than the time required to close the spill valve. The driver current is then decreased to near a lower level and held near that lower level for a variable time period in order to hold the spill valve closed so that the pump can deliver a desired amount of fuel to an engine cylinder fuel injector at the proper time. The driver current is then rapidly ramped back down to zero amps in order to open the spill valve and terminate delivery of fuel to the engine cylinder fuel injector. The actual valve closure time can be effected by various factors, such as the impedance and resistance of wiring harnesses, valve stroke settings, valve stroke changes, supply voltage variations, variations between different fuel injection pumps, variations from one cylinder to cylinder within a fuel injection pump, and variations in engine speed, load and timing. It would be desirable to control the spill valve to compensate for such variations and to thereby achieve consistent and predictable spill valve closure timing.

SUMMARY

Accordingly, an object of this invention is to provide a system for accurately controlling a spill valve of an engine fuel injection unit.

These and other objects are achieved by the present invention, wherein an engine has a fuel injection unit with a valve operable in response to a valve control signal to cause fuel to be injected into the cylinders, and a control unit which generates the valve control signal. A method of controlling the valve includes sensing a time associated with movement of the valve corresponding to start of a fuel injection event, and modifying the valve control signal as a function of the sensed time. The method further includes determining a rise time of the valve control signal, determining a valve operation delay time as a function of the rise time, determining a difference time representing a difference between a desired valve operation time and the sensed time, comparing the valve operation delay time to the difference time, and adjusting timing of the valve control signal as a function of the comparison. The method, also, as a function of the comparison, varies individual valve control signal parameter values, each associated with a particular cylinder of the engine, generates a sum value SUM representing a sum of the individual parameter values for all the cylinders, generates an average parameter AVE by dividing the SUM value by the number of cylinders, generates updated individual parameter values by subtracting the AVE value from previous individual parameter values, and modifies the valve control signal as a function of the updated individual parameter values and the AVE value.

BRIEF DESCRIPTION OF THE DRAWINGS

FIG. 1 is a simplified schematic diagram of an engine fuel injection control system;

FIG. 2 is signal timing diagram illustrating a solenoid driver current waveform generated by the ECU of FIG. 1

DETAILED DESCRIPTION

Figure 3A:
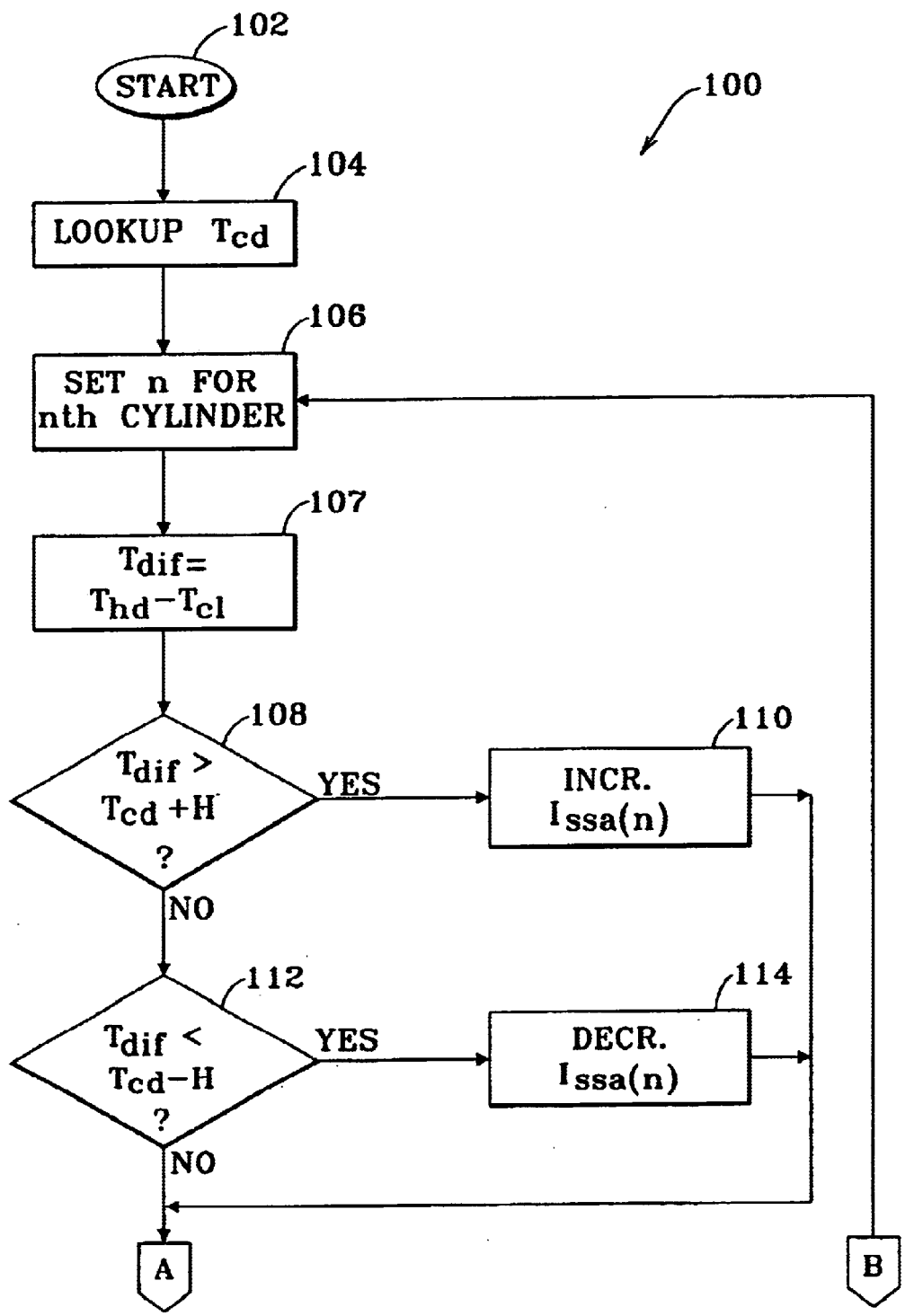
FIG. 3 is logic flow diagram illustrating an algorithm executed by the ECU of FIG. 1.

Referring to FIG. 1, an engine 10 has a plurality of cylinders 11a–11f, each of which receives fuel from an electronically controlled, distributor diesel fuel injection pump 12, such as made by Stanadyne. The pump 12 includes a normally open poppet valve or spill valve 15 which is operated by a solenoid 14 so that valve 15 closes when solenoid 14 is energized. An electronic control unit 16 includes a solenoid driver 18. The ECU 16 and the driver 18 generate and provide to the solenoid 14 a driver current or injector current. The ECU receives an engine timing or crank position signal from crank position sensor 20.

Referring now to FIG. 2, for the injection of fuel into each cylinder of the engine 10, ECU 16 and the driver 18 generate an injector current waveform 24. The current levels and times shown in FIG. 2 are merely exemplary, and any actual current waveform may vary with respect to what is shown in FIG. 2. The current waveform begins at zero amps at a start time, Tst, and rises to and oscillates between high current levels of between approximately 12 and 14 amps. An injector current rise time, Tr, is defined as the time interval between Tst and the time when the injector current rises to a certain current level, such as 10 amps. At an adjusted shutoff start time, Tass(n), the injector current is shutoff and the injector current decreases. The adjusted shutoff start time, Tass(n), is defined as equal to a shutoff start time, Tss, plus a shutoff start adjustment time value, Tssa, plus an individual shutoff start adjustment time value, Issa(n), which is individualized for each of the n cylinders.

A hold detect time, Thd, is defined as the time at which the injector current decreases to a predetermined current such as 8 amps. An actual closure time, Tcl, is determined by sensing a change in slope of the injector current caused in response to actual closure of the spill valve 15. Closure of the spill valve 15 corresponds to the beginning of fuel injection for the corresponding cylinder. An optimum closure time, Toc, represents as an optimum or desired closure time of the spill valve 15. After Tcl, the injector current is increased to an intermediate level between 8 and 10 amps, for example, for some time period until it is desired to open the spill valve 15 and stop injecting fuel into the corresponding cylinder.

Figure 3B:
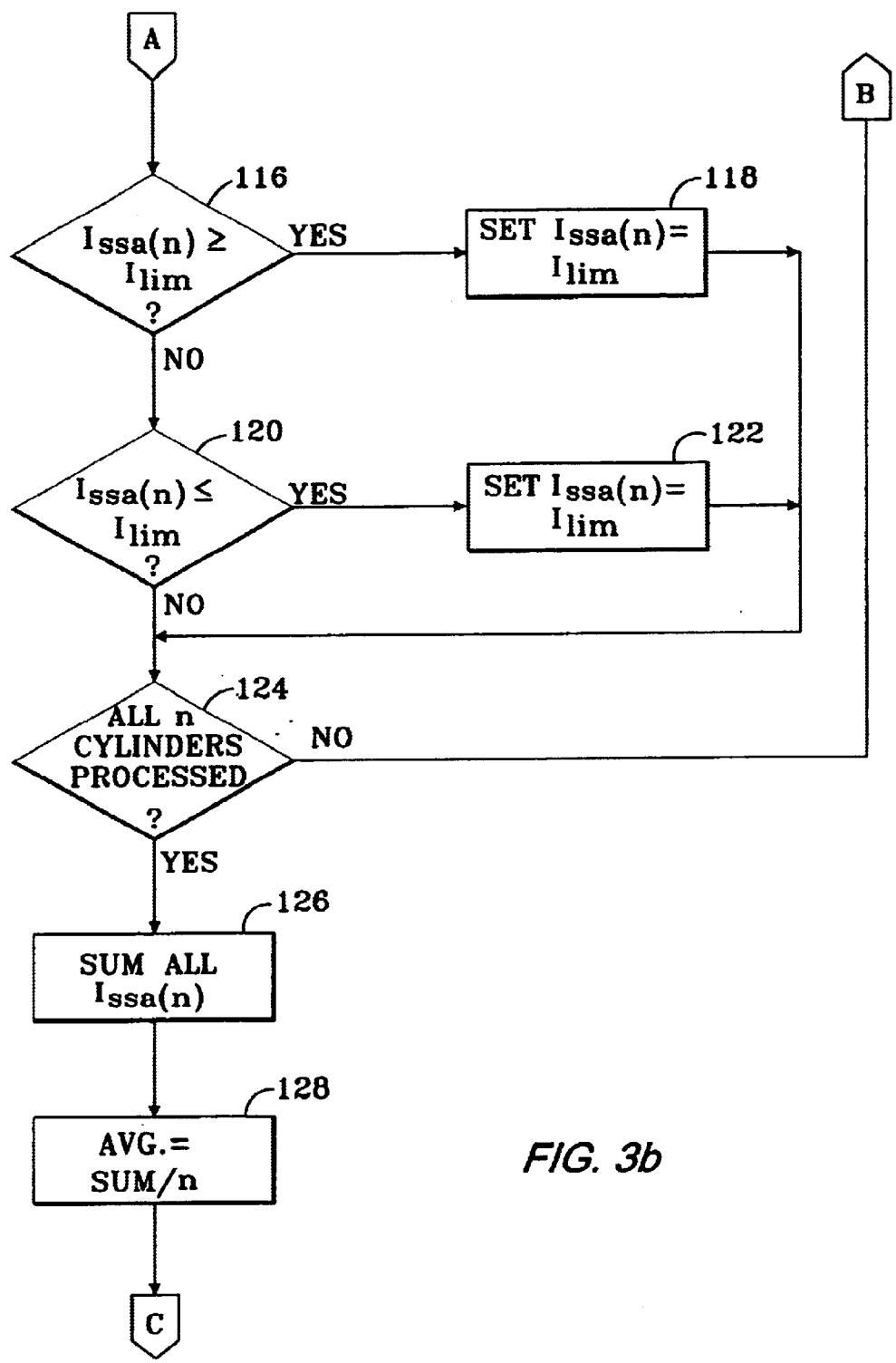
Figure 3C:
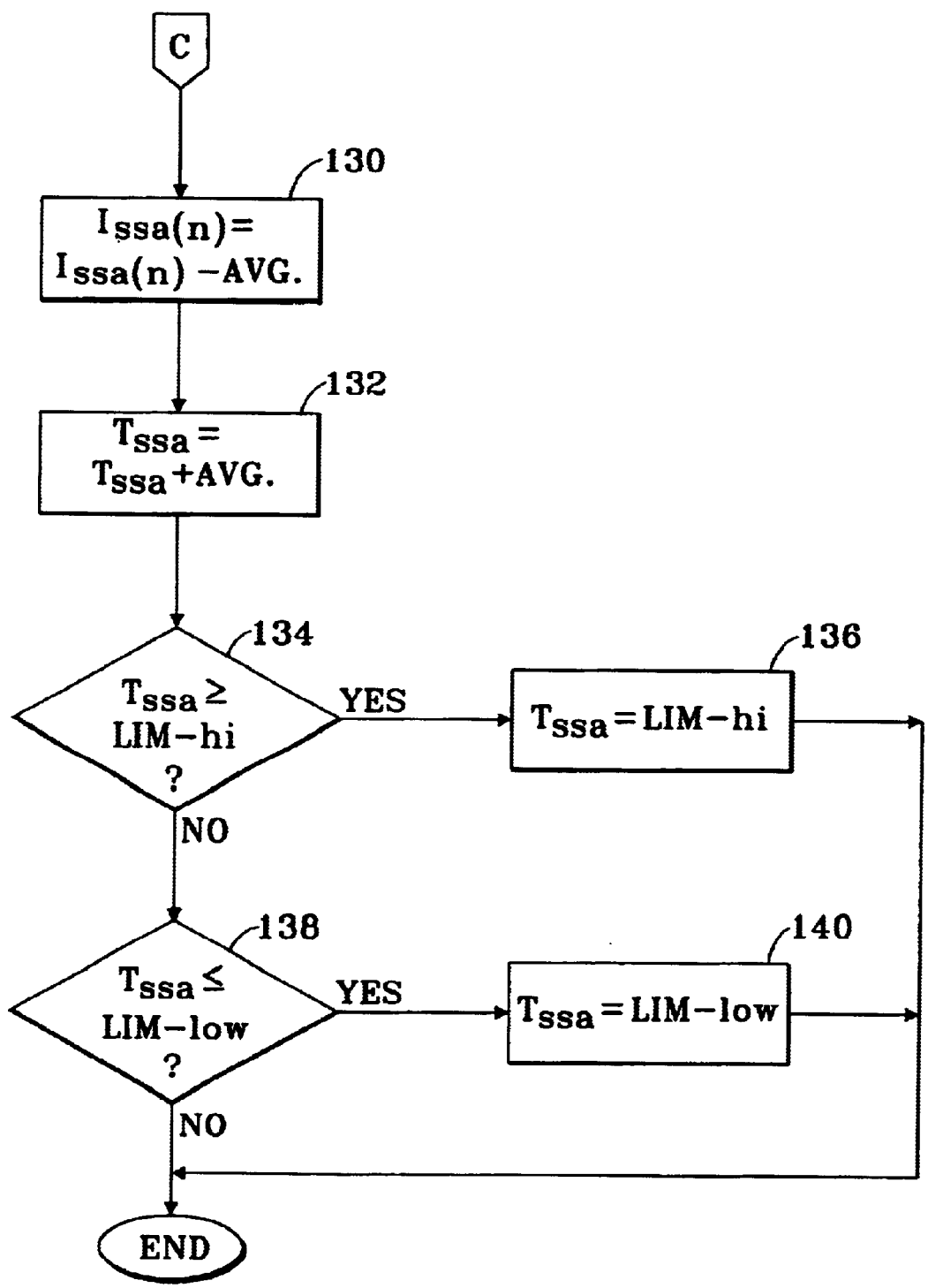

The ECU 16, periodically, such as 10 times per second, executes an algorithm 100 illustrated by FIGS. 3a–3c. The conversion of the above flow chart into a standard language for implementing the algorithm described by the flow chart in a digital computer or microprocessor, will be evident to one with ordinary skill in the art.

The algorithm starts at step 102. Step 104 obtains from a stored lookup table a closure detection delay value, Tcd. The lookup table (not shown) preferably contains a set of closure detection delay values, Tcd, each corresponding to one of a set of injector current rise times, Tr. Step 106 checks an index value, n, which is repeatedly modified so that steps 108–122 are executed for each n number of cylinders 11a–11f, one cylinder after another.

Step 107 determines a closure detect time difference, Tdif, as the time difference between the hold detect time, Thd, and the actual sensed closure time, Tcl.

Step 108 compares the closure detect time difference, Tdif, to the closure detection delay value, Tcd, from step 104 plus a predetermined hysteresis value, H. If Tdif is greater than Tcd plus H, then it means that the valve 15 is closing later than desired, and the algorithm proceeds to step 110. Step 110 increments a individual shutoff start adjustment value, Issa(n) by a shutoff start adjust value, such as 0.32 microseconds, for example. This increases the time period during which the injector current will be at its higher level, and tends to cause the valve 15 to close sooner. After step 110, the algorithm proceeds to step 116.

Returning to step 108, if Tdif is not greater than Tcd plus hysteresis, then it means that the valve 15 is not closing later than desired, and the algorithm proceeds to step 112.

Step 112 compares the closure detect time difference, Tdif, to the closure detection delay value, Tcd, from step 104 less the hysteresis H. If Tdif is less than Tcd less H, then it means that the valve 15 is earlier than desired, and the algorithm proceeds to step 114. Step 114 decrements the individual shutoff start adjust value, Issa(n), by the shutoff start adjustment value. This decreases the time period during which the injector current will be at its higher level, and tends to cause the valve 15 to close later. After step 114, the algorithm proceeds to step 116. Returning to step 112, if Tdif is not less than Tcd less hysteresis, then it means that the valve 15 is not closing earlier than desired, and the algorithm proceeds to step 116.

Step 116 compares the individual shutoff start adjustment value, Issa(n), (from step 110 or 114) to a predetermined positive individual shutoff start adjust limit value, Ilim(n). If Issa(n) is greater than or equal to Ilim(n), then step 118 sets Issa(n) equal to Ilim(n), and directs the algorithm to step 124. If Issa(n) is less than Ilim(n), then step 116 directs the algorithm to step 120.

If, in step 120, the individual shutoff start adjustment value, Issa(n), is less than or equal to −Ilim(n), then step 122 sets Issa(n) to −Ilim(n), and directs the algorithm to step 124. If Issa(n) is greater than −Ilim(n), then step 120 directs the algorithm to step 124.

Step 124 directs the algorithm to step 106 if all n cylinders have not been processed, else to step 126. If all n cylinders have been processed, then step 126 generates a summation, SUM, of all the individual shutoff start adjustment values, Issa(n), for all n cylinders. Step 128 calculates an average value, AVE, by dividing SUM from step 126 by the number of cylinders, n.

Step 130 generates new individual shutoff start adjustment values, Issa(n) by subtracting this average value, AVE, from each of the old individual shutoff start adjustment values, Issa(n).

Step 132 then calculates a new base shutoff start adjustment value, Tssa, as the sum of the previous base shutoff start adjustment value, Tssa, and the AVE value from step 128.

In step 134, if Tssa is greater than or equal to a shutoff start adjust high limit, LIM-hi, such as +250 microseconds, then step 136 sets Tssa equal to LIM-hi, else the algorithm proceeds to step 138.

In step 138, if Tssa is less than or equal to a shutoff start adjust low limit, LIM-low, such as −250 microseconds, then step 140 sets Tssa equal to LIM-low, else the algorithm ends at step 142.

Thus, the above described algorithm repeatedly determines a new base shutoff start adjustment value, Tssa. This new base shutoff start adjustment value, Tssa, is used by the ECU 16 to adjust or establish the duration of the initial portion of the next set of injector current waveforms for the next set of n cylinder fuel injection events. As described previously in connection with FIG. 2, the adjusted shutoff start time for each nth cylinder, Tass(n), is equal to a shutoff start time value, Tss, plus the shutoff start adjustment time value, Tssa, plus the individual shutoff start adjustment time value, Issa(n), which is individualized for each of the n cylinders, as described above.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In an engine having n cylinders, a diesel fuel injection pump with a valve operable in response to a valve control signal to cause fuel to be injected into the cylinders, and a control unit generating the valve control signal, a method of controlling the valve comprising:

sensing a time associated with movement of the valve corresponding to start of a fuel injection event; and modifying the valve control signal as a function of the sensed time.

2. In an engine having n cylinders, a fuel injection unit having a valve operable in response to a valve control signal to cause fuel to be injected into the cylinders, and a control unit generating the valve control signal, a method of controlling the valve comprising:

sensing a time associated with movement of the valve corresponding to start of a fuel injection event; and modifying the valve control signal as a function of the sensed time.

3. The method of claim 2, wherein:

determining a rise time of the valve control signal;

determining a valve operation delay time as a function of the rise time;

determining a difference time representing a difference between a desired valve operation time and the sensed time;

comparing the valve operation delay time to the difference time; and adjusting timing of the valve control signal as a function of the comparison.

4. The method of claim 3, further comprising:

as a function of the comparison, varying individual valve control signal parameter values Issa(n), each associated with a particular cylinder of the engine;

generating a sum value SUM representing a sum of the individual parameter values Issa(n) for all the cylinders;

generating an average parameter AVE by dividing the SUM value by the number of cylinders;

generating updated individual parameter values Issa(n) by subtracting the AVE value from previous individual parameter values Issa(n); and modifying the valve control signal as a function of the updated individual parameter values Issa(n).

5. The method of claim 4, further comprising:

limiting the individual parameter values Issa(n) to a predetermined limit value, Ilim.

6. The method of claim 4, further comprising:
generating a valve control signal adjustment value Tssa as a sum of a previous valve control signal adjustment value Tssa and the average value AVE.

7. The method of claim 4, further comprising:
limiting the valve control signal adjustment value Tssa to a predetermined limit value, (LIM-hi, LIM-low).

8. The method of claim 6, further comprising:
generating a valve control signal value, Tass(n) for each cylinder as a sum of a shutoff start time value, Tss, plus the valve control signal adjustment value, Tssa, plus the individual parameter value, Issa(n).

9. The method of claim 8, wherein:
the valve control signal adjustment value, Tssa, comprises a shutoff start adjustment time value; and the individual parameter value, lssa(n), comprises an individual shutoff start (adjustment time value.

* * * * *